United States Patent
Strathmeyer et al.

(10) Patent No.: US 7,126,942 B2
(45) Date of Patent: *Oct. 24, 2006

(54) APPARATUS AND METHOD FOR INTEGRATED COMPUTER CONTROLLED CALL PROCESSING IN PACKET SWITCHED TELEPHONE NETWORKS

(75) Inventors: Carl R. Strathmeyer, Reading, MA (US); Donald Finnie, Reading (GB)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/072,468

(22) Filed: Feb. 6, 2002

(65) Prior Publication Data

US 2002/0101862 A1    Aug. 1, 2002

Related U.S. Application Data (63) Continuation-in-part of application No. 09/723,747, filed on Nov. 28, 2000, and a continuation-in-part of application No. 09/805,501, filed on Mar. 13, 2001, which is a continuation-in-part of application No. 08/955,834, filed on Oct. 21, 1997, now Pat. No. 6,201,805.

(51) Int. Cl.
    *H04L 12/66* (2006.01)

(52) U.S. Cl. .................................... 370/352

(58) Field of Classification Search ........... 370/352, 370/356, 389, 400, 401, 412, 429, 493; 709/102, 709/103

See application file for complete search history.

(56) References Cited

U.S. PATENT DOCUMENTS 5,724,412 A    3/1998    Srinivasan (Continued)

FOREIGN PATENT DOCUMENTS

EP    0 843 454 A2    5/1998

(Continued)

OTHER PUBLICATIONS

H. Schulzrinne & J. Rosenberg, "Signaling for Internet Telephony," IEEE, 1998, pp. 298-307, USA.

(Continued)

*Primary Examiner*—Chi Pham
*Assistant Examiner*—Anh-Vu Ly
(74) *Attorney, Agent, or Firm*—Kacvinsky LLC (57) ABSTRACT

A communication management method and apparatus is presented. Such method and apparatus operate to transmit, from an application computer in communication with a gatekeeper which is connected to a data network, messages indicative of (a) telephone calls in progress at an endpoint of the data network, or (b) such endpoint, and to transmit, from the gatekeeper to the application computer, messages indicative of a variety of information contained in the telephone calls so as to process such information for a variety of applications. The invention provides protocols for classifying incoming messages and prioritizing these messages for the presentation to, and utilization by, a system user.

21 Claims, 8 Drawing Sheets

U.S. PATENT DOCUMENTS

| | | |
|---|---|---|
| 5,867,494 A | 2/1999 | Krishnaswamy et al. |
| 5,905,872 A | 5/1999 | DeSimone et al. |
| 6,026,087 A | 2/2000 | Mirashrafi et al. |
| 6,061,365 A | 5/2000 | Yeung et al. |
| 6,094,479 A | 7/2000 | Lindeberg et al. |
| 6,185,288 B1 | 2/2001 | Wong |
| 6,199,096 B1 | 3/2001 | Mirashrafi et al. |
| 6,201,805 B1 | 3/2001 | Strathmeyer |
| 6,212,192 B1 | 4/2001 | Mirashrafi et al. |
| 6,229,883 B1 | 5/2001 | Kakizaki et al. |
| 6,339,593 B1 | 1/2002 | Kikinis |
| 6,407,996 B1 | 6/2002 | Witchalls |
| 6,490,275 B1 | 12/2002 | Sengodan |
| 6,614,781 B1 | 9/2003 | Elliott et al. |
| 2001/0026548 A1 | 10/2001 | Strathmeyer et al. |
| 2001/0028711 A1 | 10/2001 | Antonucci et al. |
| 2001/0036176 A1 | 11/2001 | Girard |
| 2002/0067816 A1 | 6/2002 | Bushnell |
| 2002/0159574 A1 | 10/2002 | Stogel |
| 2003/0142807 A1 | 7/2003 | Dolan et al. |
| 2003/0147518 A1 | 8/2003 | Albal et al. |
| 2004/0179516 A1 | 9/2004 | Neyman |

FOREIGN PATENT DOCUMENTS

| | | |
|---|---|---|
| EP | 1 113 656 A2 | 7/2001 |
| EP | 1 211 875 A2 | 6/2002 |
| WO | WO 98/02999 | 1/1998 |
| WO | WO 00/76158 A1 | 12/2000 |
| WO | WO 00/79756 A2 | 12/2000 |
| WO | WO 0/22720 A2 | 3/2001 |
| WO | WO 01/43379 A1 | 6/2001 |
| WO | WO 01/59987 A2 | 8/2001 |
| WO | WO 01/69899 A2 | 9/2001 |
| WO | WO 01/78358 A2 | 10/2001 |

OTHER PUBLICATIONS

J. Rosenberg et al., "Programming Internet Telephony Services," IEEE Network, May/Jun. 1999, pp. 42-49, USA.

H. Schulzrinne & J. Rosenberg, "The Session Initiation Protocl: Internet-Centric Signaling," IEEE, 2000, pp. 134-141, USA.

APPARATUS AND METHOD FOR INTEGRATED COMPUTER CONTROLLED CALL PROCESSING IN PACKET SWITCHED TELEPHONE NETWORKS

CROSS-REFERENCE TO RELATED APPLICATIONS

This application is a continuation-in-part of each of pending U.S. patent application Ser. No. 09/723,747, filed Nov. 28, 2000, and Ser. No. 09/805,501, filed Mar. 13, 2001, each of which is itself a continuation-in-part of U.S. patent application Ser. No. 08/955,834, filed on Oct. 21, 1997, now issued as U.S. Pat. No. 6,201,805.

TECHNICAL FIELD

This invention relates to computer telephone integration (CTI) and, more specifically, to an improved method and apparatus for utilizing CTI techniques to process telephone calls using various applications in a packet switched telephone network.

BACKGROUND OF THE INVENTION

Telephony over packet networks, particularly over wide area networks such as the Internet, has received considerable attention in recent years. Specifically, scientists have begun exploring the possibility of sending voice and video information streams over packet switched data networks. The transmission of such information streams over packet switched networks can be more cost efficient than traditional telephony, which requires a dedicated circuit between the calling and called party. Transmitting voice information on the data network also removes the requirement to have a separate voice/telephony network.

Computer telephone integration has been widely applied to traditional telephony methods and apparatus, but has not as yet been successfully applied to the methods and apparatus used for packet network telephony. This invention specifies novel apparatus and methods, supplementary to known packet network telephony apparatus and methods, which enable CTI capabilities in such an environment, and use them to process telephone calls. In particular, the invention described herein enables packet network control by a third party which is deemed to be preferred to first party control systems.

One possible set of methods and apparatus for completing calls over a packet switched network, which calls can handle voice and other information streams, is defined by ITU Recommendation H.323. The H.323 standard is available from the International Telecommunication Union, of Geneva, Switzerland, and is hereby incorporated herein by this reference. The H.323 standard defines various protocols dealing with call control, call setup, call termination, and other similar techniques known to those in the packet network telephony art.

The H.323 standard defines a functional entity called a gatekeeper. The gatekeeper handles network functions such as bandwidth control, zone management, address translation, and admissions control for a designated set of network terminals. While all these functions are further defined in the previously incorporated standard, we set forth two examples below.

Bandwidth control provides a protocol by which the gatekeeper allocates a particular amount of network bandwidth to a particular connection. The gatekeeper can be contacted by either the calling or called party in order to change the amount of bandwidth allocated to a particular call, for example, because one endpoint only has access to a limited set of voice codes.

As another example, the gatekeeper performs zone management. This function, as further defined in the H.323 standard, provides a mechanism for allocating sets of different terminals and other nodes in the network to a particular gatekeeper. The H.323 standard provides a mechanism for dynamically altering the allocation of different network nodes to different gatekeepers.

The gatekeeper function provides services analogous to the call processing function within a private branch exchange (PBX) in conventional telephony. In traditional telephony, CTI features are provided by creating an interface between external application software and the call processing function within the PBX. By contrast, in the known packet network telephony art, interfaces to the gatekeeper are only defined from other gatekeepers, end points, and other network entities.

Utilizing and building upon the call processing functions of an H.323 gatekeeper, or an analogous entity defined by other packet switched data network standard, call processing applications commonly known in conventional telephony can be implemented in a packet switched data network. The present invention describes the implementation, over a packet switched data network, a system for the storage and retrieval of a variety of communications messages of various types. In such a system a user can manage her voice mail, email, pager, fax and data communications under a "one-stop shopping" universal messaging system, reaping the benefits of telephony based communications integrated within packet data networks. Such functionalities are commonly known in conventional telephony as "Universal Messaging", "Universal Queuing", and the like.

DETAILED DESCRIPTION OF THE PREFERRED EMBODIMENT

For illustrative purposes the present invention will be described using the H.323 protocol and its defined entity, the "gatekeeper." Such exemplification is not intended in any way to limit the scope of the invention, which is intended to include, and could just as well be described using, any of a number of other packet network telephony protocols and their analogous entity or entities to the H.323 gatekeeper, end point, applications computer, etc.

Figure 1:
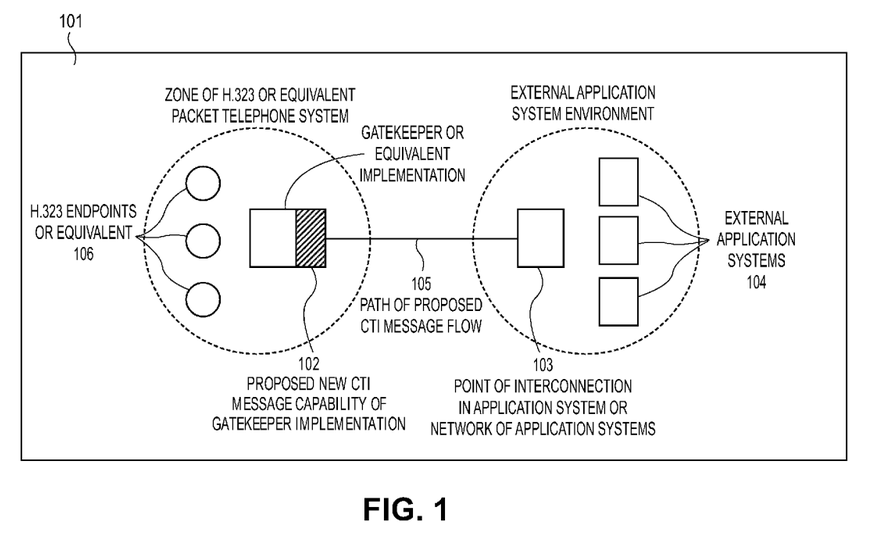
FIG. 1 shows a conceptual overview of an exemplary embodiment of the present invention as incorporated into a packet network telephony system.

FIG. 1 illustrates an overview of the interconnection of the gatekeeper computer 102 with the applications computer 103 according to the teachings of the present invention. To enable such interconnection, gatekeeper computer 102 is enhanced and extended by the addition of software whose functions are described below. Communications path 105 may be any type of data communications path.

The arrangement of FIG. 1 includes several external telephony applications systems 104, typically implemented as software, which may be located on applications computer 103 or on separate computers connected via any communications network to applications computer 103. Typically, the applications computer may be physically close to one of the end points described below.

The arrangement of FIG. 1 also includes end points 106, which may be personal computers, network computer devices (NCs), or any other node capable of interconnection to the packet network telephony environment.

In operation, a message is issued from an applications computer 103 requesting certain telephony services which will be described below. The message requesting such a service is transmitted through path 105 to gatekeeper computer 102 for processing. The message sent to gatekeeper 102 causes gatekeeper 102 to exchange appropriate signaling messages with other packet network telephony environment nodes in a manner as described, for example, in the incorporated H.323 standard. As a result of this sequence of events, the combined system is able to implement the call processing functionality requested by applications computer 103 on behalf of application 104.

During operation, various call control functions requested by applications computer 103 are performed by gatekeeper 102. Additionally, by making appropriate requests of gatekeeper 102, applications computer 103 may monitor the outcome of various call control functions and transmit such outcome to any of application systems 104.

Figure 2:
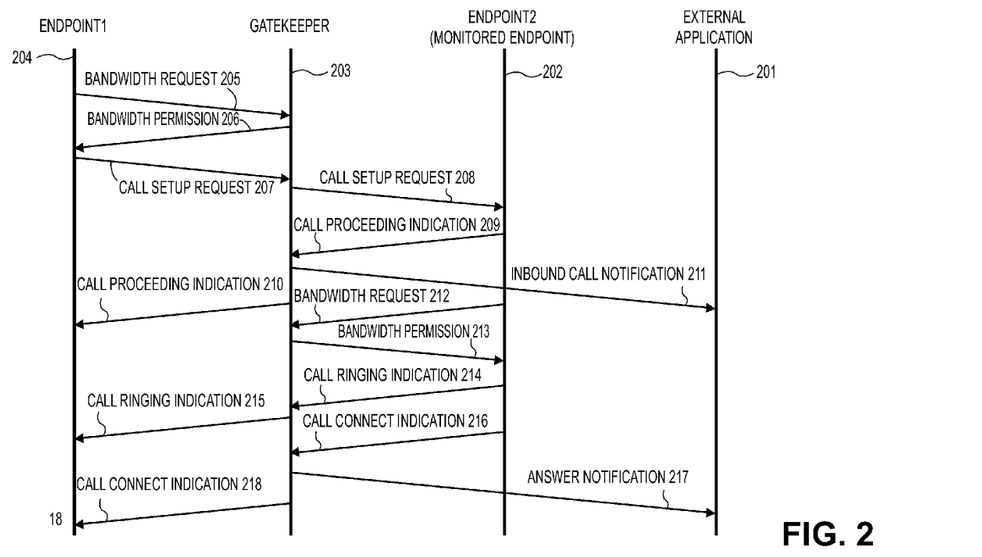
FIG. 2 shows exemplary message flow between system elements during the establishment of an inbound call that is detected by an external software application using the packet network telephony system as enhanced and extended by the present invention.

FIG. 2 shows an exemplary message flow diagram for detecting an inbound call from a remote end point to a local end point supervised by an external computer telephony application using the present invention. The specific example shown in FIG. 2 is the monitoring of an incoming call to end point 202 using packet network telephony methods and apparatus as described in the H.323 standard, enhanced by the present invention to permit the participation of an external software application 201. End points 202 and 204 represent audio terminals, for example, computer systems equipped as H.323 compliant telephone devices. Gatekeeper 203 is as described, for example, in the H.323 standard and as further enhanced by the present invention, and the external application 201 may be present on a separate computer as previously discussed.

In operation, the call initially proceeds according to the methods of the packet network telephony environment. A bandwidth request message 205 is sent to gatekeeper 203 and bandwidth is granted by the gatekeeper at message 206. A call setup request, message 2074, is issued by the initiating end point 204, and gatekeeper 203 causes call setup request message 208 to be transmitted to receiving end point 202. A call proceeding message 209 is transmitted by the receiving end point back to gatekeeper 203 and relayed to initiating end point 210 as shown.

At approximately the same time gatekeeper 203 relays the call proceeding indication to the initiating end point using message 210, gatekeeper 203 also transmits to external application 201 a notification that an inbound call is being received by the receiving end point 202. Gatekeeper 203 sends this message because external application 201 has previously indicated that it requires notification of telephony events occurring at receiving end point 202.

In order to connect the inbound call, receiving end point 202 requires network bandwidth, and such bandwidth is requested from and allocated by the gatekeeper 203 using messages 212 and 213. Next, the terminal at monitored end point 202 rings to alert the user to the arriving call, and an indication of such ringing is transmitted through messages 214 and 215 to initiating end point 204 through the gatekeeper 203. When the call is connected at the receiving end point 202 because of user action, end point 202 informs gatekeeper 203 via message 216.

At this point, gatekeeper 203 sends an answer notification to the external application 201 via message 217.

At approximately the same time, gatekeeper 203 indicates to the initiating end point 204 that the requested call has been connected via message 218.

In accordance with the protocol described hereinbefore, the detection of the call by an external application is accomplished via a protocol of messages transmitted between the gatekeeper and the end points to be connected, as well as between the gatekeeper 203 and the external application 201, thus enabling gatekeeper 203 to inform external application 201 regarding the progress of relevant calls in the packet telephony network.

Figure 3A:
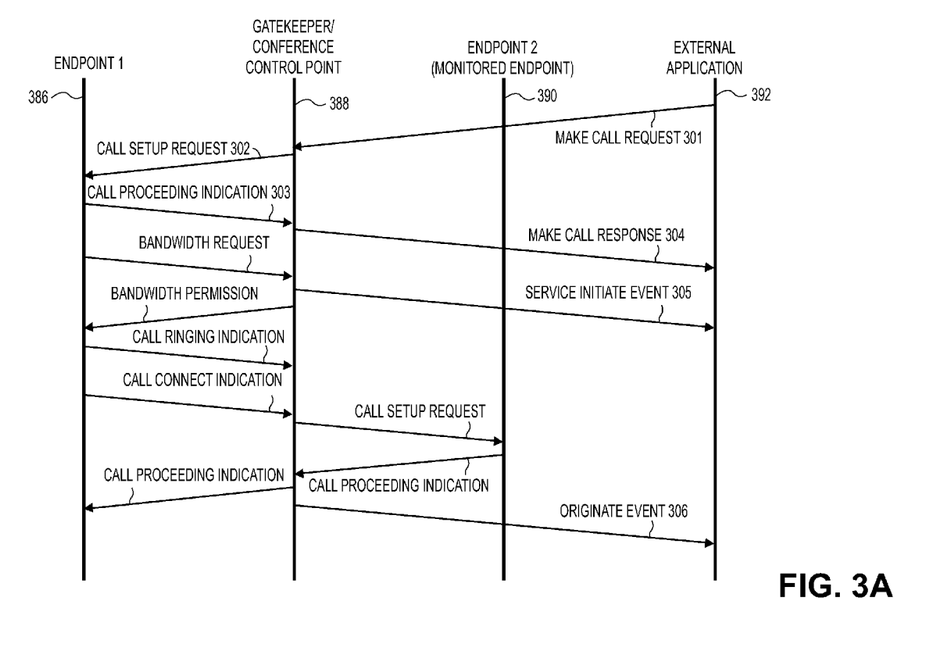
FIGS. 3A and 3B show an exemplary message flow diagram utilizing the invention to establish an outbound call requested by an external software application in a similar environment.
Figure 3B:
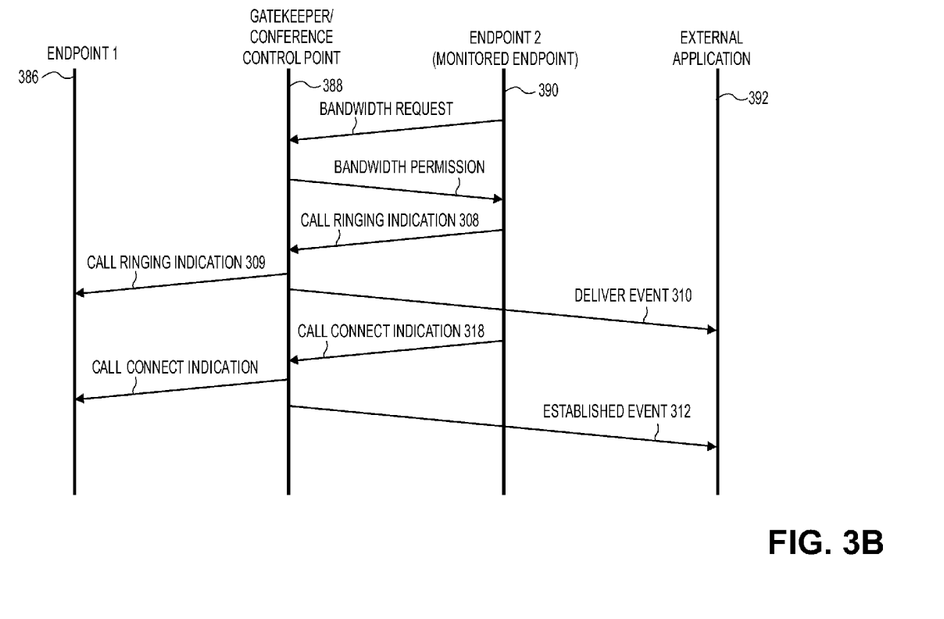

FIGS. 3A and 3B show another example of an external call processing application requesting the establishment of an outbound call from initiating end point 386 to receiving end point 390. Many of the messages involved in this operation are substantially similar to those previously set forth with respect to the monitoring of the inbound call described in FIG. 2. New messages not previously discussed in FIG. 2 are described below. As with the discussion of FIG. 2, the external application 392 in FIGS. 3A and 3B is assumed to have previously communicated with gatekeeper 388 in accordance with other methods described by this invention to indicate its intention to issue call control requests with respect to initiating end point 386.

In FIGS. 3A and 3B, gatekeeper 388 also includes the conference control point function as currently known to the packet network telephony art. This function is used by the invention to interconnect two call segments, namely the segment between the initiating end point 386 and the conference control point; and between the conference control point and the receiving end point 390. The invention connects the call in two stages in order to overcome certain limitations of the known packet network telephony art. For clarity of description, the combined gatekeeper and conference control point apparatus is referred to as a gatekeeper 388.

The sequence of messages begins with a new message 301, specified by the current invention, through which the external application 392 makes a request that the first segment of the call be established from gatekeeper 388 to initiating end point 386.

Next, according to known packet network telephony art, messages 302 and 303 are exchanged between gatekeeper and initiating end point 386 in order to set up that first leg of the call.

Next, the gatekeeper 388 sends a new message 304 to external application 392 to alert it that the call request has been received and is being processed. Much of the remaining signaling, relating to the establishment of that segment of the call between initiating end point 386 and gatekeeper 388 in FIGS. 3*a* and 3*b*, is substantially similar to that previously described with respect to FIG. 2 and thus will not be repeated. Similarly, once the first leg of the call has been set up, gatekeeper 388 proceeds in similar fashion to set up the second leg of the call from itself to receiving end point 390.

However, during the process depicted in FIGS. 3A and 3B gatekeeper 388 sends new messages to the external application 392 at relevant stages of call processing, including:

1. Message 305 indicating that initiating end point 386 has acquired the necessary network bandwidth to place the call;
2. Message 306 indicating that receiving end point 390 is processing the request for the call;
3. Message 310 indicating that receiving end point 390 is alerting its user to the arriving call; and
4. Message 312 indicating that receiving end point 390 has answered the call and a connection has been established.

Figure 4:
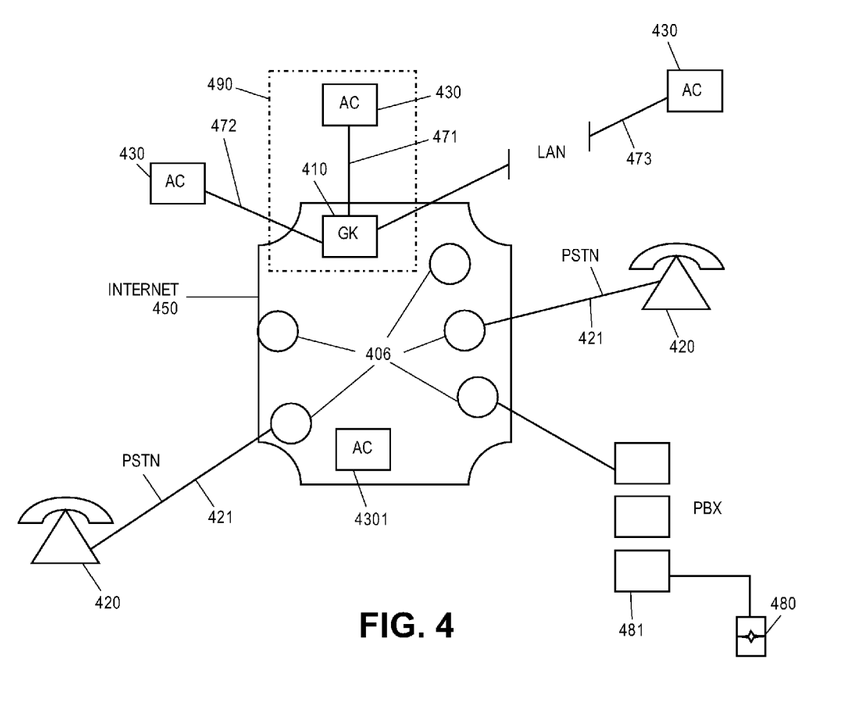
FIG. 4 shows exemplary connections between the gatekeeper computer and processing application computers controlling the gatekeeper computer.

FIG. 4 shows various possible connections for the gatekeeper computer-processing application computer link. A gatekeeper computer 410 facilitates calls between the various H323 or equivalent endpoints 406. As an example, these endpoints can be connected to telephones 420 via PSTNs 421. Alternatively, the endpoints can be connected to other computers or devices, such as PBXs 481, which then interface to, as an example, cellular networks 480.

The processing application computers (AC) 430 are connected to the gatekeeper computer (GK) 410 in a variety of ways, some of which are shown as examples in FIG. 4. The gatekeeper computer sets up and controls call sessions between the various H.323 or equivalent endpoints 406.

One or more ACs 430 can be connected to the GK 410 via a LAN 473, a generic data network 472, or via interprocess software communication 471, where both the GK and AC are software modules on the same physical computing device, shown via the dotted line box 490 drawn around these components connected via the interprocess software communication 471.

Alternatively, the AC 4301 and GK 410 can be themselves connected via the Internet 450, or other computer communications network. Or, the GK 410 could write to a file, stored, and then itself transmitted to an AC 430, via a variety of data transmission channels, as described above, or as is otherwise known in the art.

The ACs 430, communicating with the GK in an analogous fashion as described above, can implement, via a variety of applications programs, applications and services such as voice recognition of the words exchanged in the call, rerouting the call if unanswered after a determined number of rings, measurement of the length of the call, and storing the word content of calls as determined by the above described voice recognizer and writing such content to a file for analysis by another program, to list a few. As described above these applications are usually implemented in software, but could be serviced, wholly or partially, in dedicated hardware as well, especially in complex applications requiring a lot of processing.

The system of the present invention is also capable of managing several different modes of communication that are processed through the computer. As used herein, the term managing refers to the functions of receiving, classifying, queuing, presenting, and providing to the system user. The communication modes that are prevalent in relation to computer processing include, but are not limited to, voice calls, email, facsimile transmission, chat-based communication and responses from visitors to a web page, also referred to as web mail. Voice calls may be further divided into traditional cable connected calls and packet transmitted calls, but such subdivision will have no effect in the description to follow. The programming of an application for managing incorporates an ability to distinguish among the various modes of communication, thus enabling the application to classify and differentially handle the different communication modes.

Communication by various modes is typically received during any time period of the day. The communications are not received in any particular order, but merely according to the whim of the sender or possibly the speed of the system. Thus, an email may be received first, followed by a fax, followed by another fax followed by a chat-based communication, etc., in no special order. However, the system is able to categorize each of the modes of communication according to an established classification system, using priority categories according to the user's requirements. Once classified, the individual communications can be placed in a queue according to a category-based priority. As an example of this type of prioritization, the following sequence may be appropriate:

1. any communication from Ms. X.
2. any email from Mr. Z
3. voice calls
4. other email transmissions
5. chat communication
6. faxes
7. web page based email Each time an incoming message is processed in the system, the computer will provide a visible or audible signal to the user as notification of receipt. At the completion of the cycle of classification and prioritization, the application will present the queued communications to the user of the system in the established order according to category for the user to open and process. Each of the communications will have a connected hyperlink on which the user can click for access.

Figure 5A:
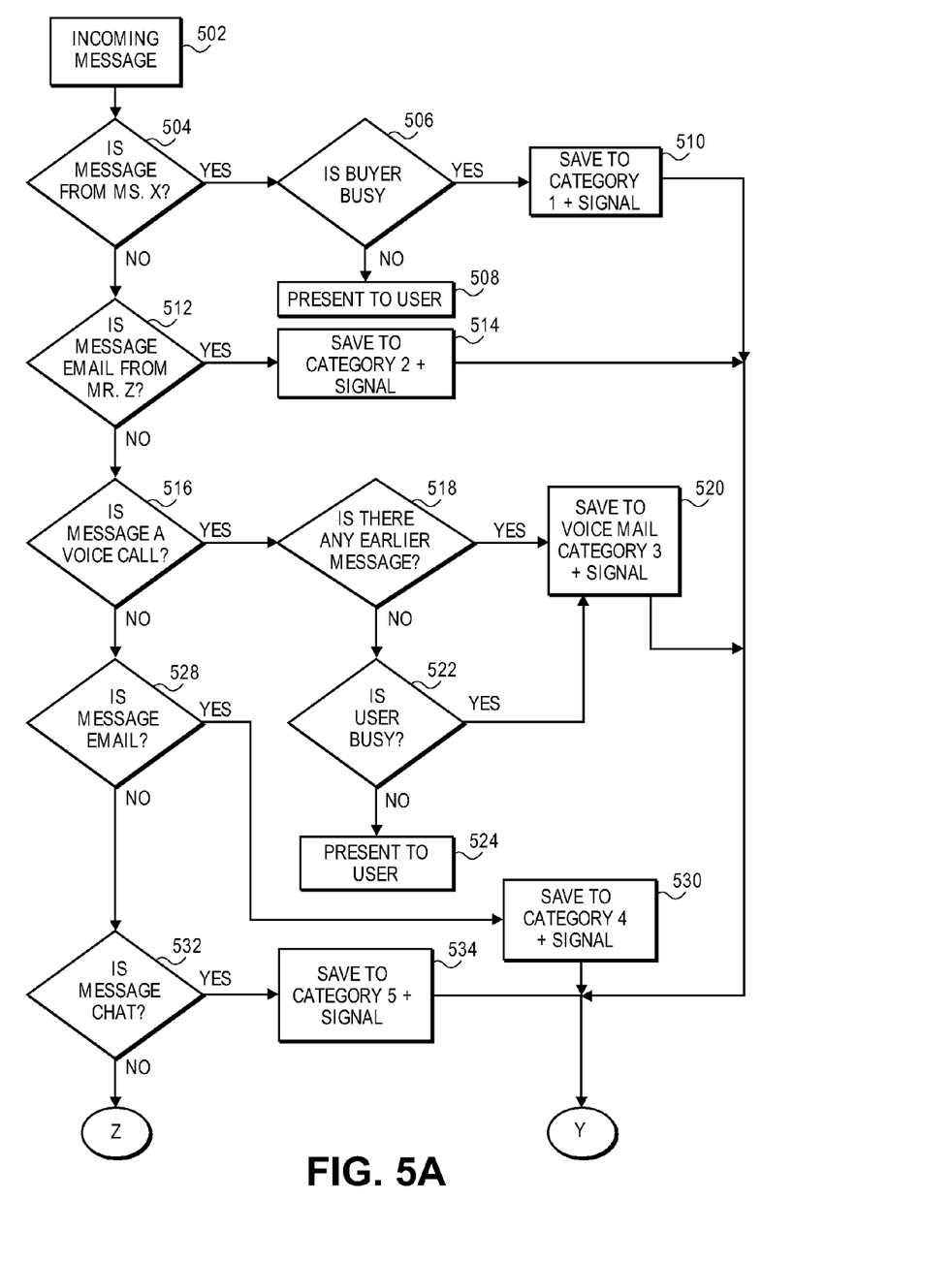
FIGS. 5A and 5B are a flowchart of the process by which the present invention classifies, manages, stores, and presents incoming communications.
Figure 5B:
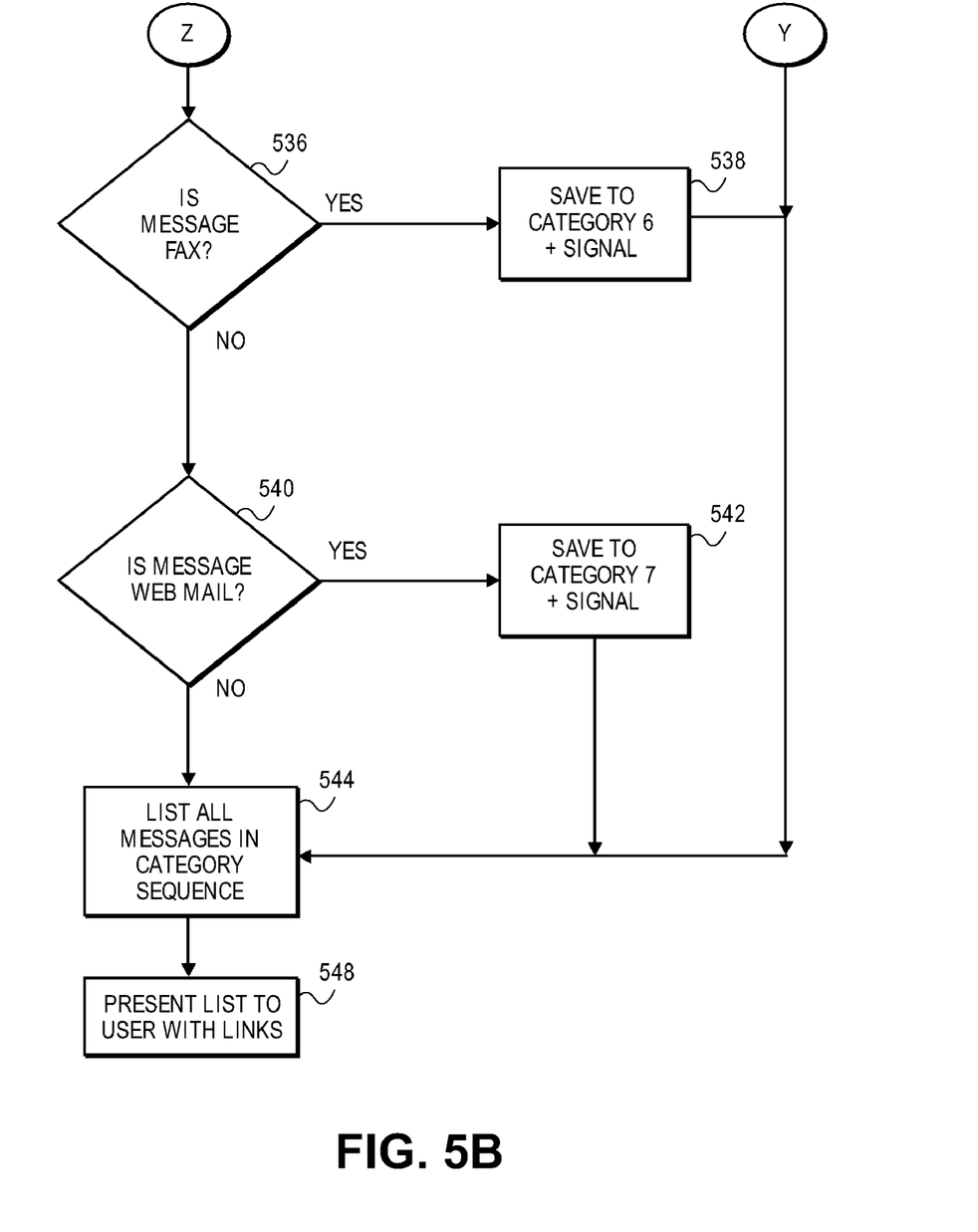

According to the flowchart illustrated in FIGS. 5A and 5B, an incoming communication is received at step 502. The application proceeds to assign an established classification category to the communication as per the list above. The process begins with a determination of whether the message is from a particular sender, i.e. Ms. X, at step 504. If so, the application checks whether the system user is occupied at step 506. If the user is not busy, the message from Ms. X is forwarded to the user at step 508. If the user is busy, the message from Ms. X is placed into a storage device in category 1 and a signal is sent to the user at step 510 that the message was received and is saved.

If the incoming message is not from Ms. X, the application checks if the message is in the form of email from Mr. Z at step 512. If the response is affirmative, the message is saved to category 2 and a signal is sent to the user at step 514.

If the message is not an email from Mr. Z, a determination is made of whether the message is a voice call (other than that from Ms. X that would have been handled above) at step 516. If the message is a voice call, the application checks if there are any earlier messages in queue at step 518, and if so, places the voice call into voice mail, equal to category 3, and signals the user at step 520. If there are no earlier messages, the application checks if the user is busy at step 522. If the system user is busy, the call is placed into voice mail and a signal is generated in step 520. If the user is not busy, the system presents the voice call to the user at step 524.

If the incoming message is not a voice call, a determination is made as to whether the message is an email at step 528, and, if so, saves the email to category 4 and signals the user at step 530.

If the incoming message is not an email, the application determines if it is a chat-type message at step 532. If so, the chat message is saved to category 5 at step 534 and a signal is generated.

The flowchart connects from FIG. 5A to FIG. 5B at markers Z and Y. If the message is not a chat-type message, a determination is made whether the message is a fax message at step 536. If the message is a fax, it is saved to category 6 at step 538 and a signal is generated. If the message is not a fax, the application checks if the message is web mail at step 540. If the incoming message is web mail, it is saved to category 7 at step 542 and a signal is generated.

As a further embodiment, the application can determine whether the system user is busy in relation to each incoming message, only saving the message when it cannot be immediately presented to the user.

Subsequent to each of the steps involving saving messages and generating signals, the next steps of the flowchart list and sorts all messages according to the category assigned and, within a category, time of receipt, at step 544. The list is presented to the system user at step 548. The list typically is presented to the user on a monitor. Each of the items on the list is connected with a link that is activated by clicking with the computer mouse (not shown) to view its contents.

Figure 6A:
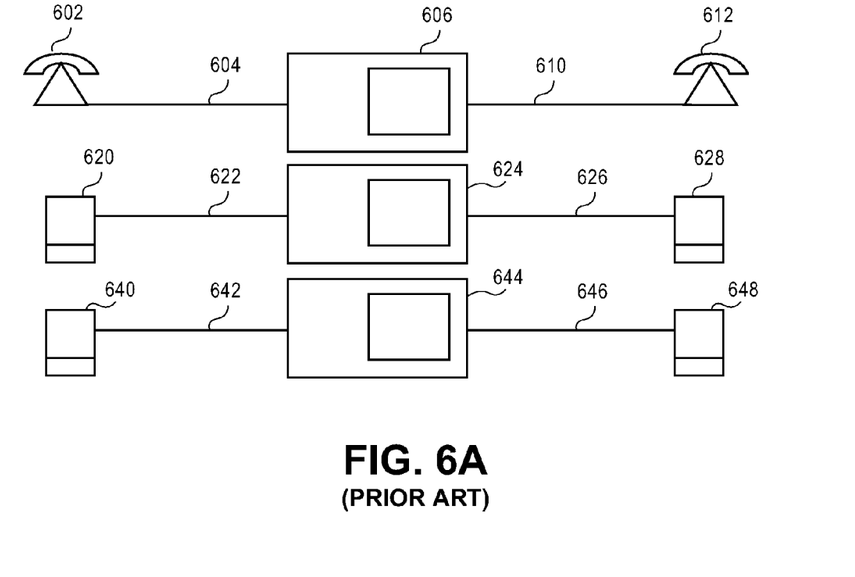
FIG. 6A is a schematic diagram of a number of parallel communication systems according to the prior art.

FIG. 6A shows a plurality of schematic computer controlled communication systems according to the prior art for comparison with the integrated system according to the present invention. A voice communication system originates with a sending unit, for example telephone 602, connected through communication link 604 to a communication processing apparatus, for example PSTN 606. PSTN 606 processes a communication from telephone 602 so as to route to an intended recipient and transmits the communication through link 610 to a receiving unit, for example telephone 612.

A second communication system involves a sending unit, for example terminal 620, connected through communication link 622 to communication processing apparatus, for example email server 624. Email server 624 processes the communication from terminal 620 to determine its intended recipient and proceeds to forward the communication through link 626 to receiving terminal 628.

A third communication, substantially in parallel with the earlier described systems, begins at sending terminal 640 connects through communication link 642 to communication server 644. Communication server 644 processes the communication from terminal 640 to determine its intended recipient and proceeds to forward it through link 646 to receiving terminal 648.

The prior art system described above connects three exemplary communications, e.g. a voice communication, an email communication, and a network-based communication, through three parallel systems. No provision is made for combining and coordinating the communications, leaving this task to the recipient. Telephone 612, terminal 628 and terminal 648 may be in the same office. If all of the communications in the examples above occur at the same time to the same recipient, the result may be difficult to manage.

Figure 6B:
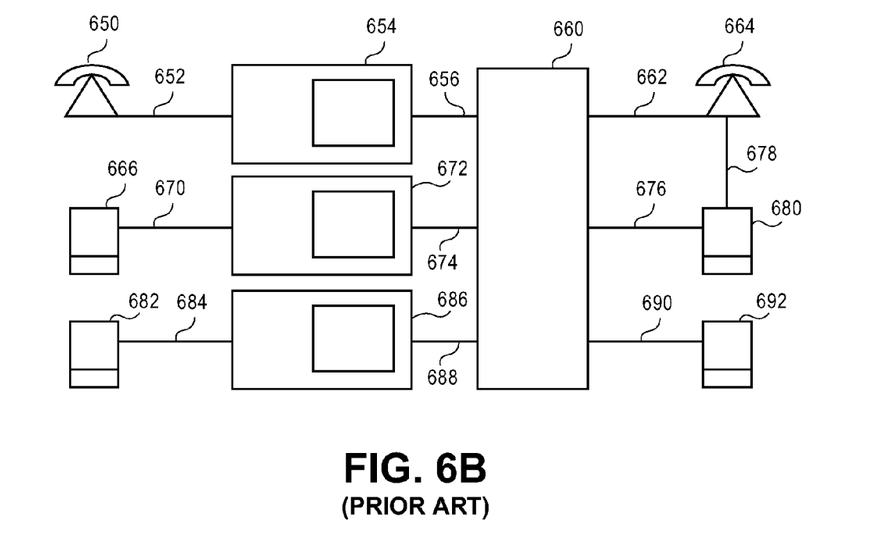
FIG. 6B is a schematic diagram of an integrated computer controlled communication system according to the present invention.

FIG. 6B illustrates an integrated communication system according to the present invention, incorporating the packet switching transmittal technology and implementing the call management rules described above. A call is initiated at a sending unit, for example telephone 650, and transmitted through communication link 652 to PSTN 654. Communication link, as used herein, refers to any means of signal transmission, now known or developed in the future, some present examples being electrical wire, optical cable, RF, microwave, etc. PSTN 654 determines the intended recipient and forwards the call through link 656 to integrated server 660. Integrated server 660 is a computer device that is capable of managing communications in numerous forms and implementing the rules described hereinabove in respect to prioritization of messages. Integrated server 660 is adapted to receive and store communications intended for plural recipients until needed. In the present invention system, a plurality of integrated servers are connected by links to a plurality of PSTN units. The transmitted communication contains addressing information that determines a specific integrated server to receive the communication for the ultimate recipient.

A sending unit, for example terminal 666, transmits a communication through communication link 670 to a communication processing unit, for example email server 672. Email server 672 receives the communication and identifies the recipient, then forwarding the communication through link 674 to integrated server 660.

A second sending unit, for example terminal 682, transmits a communication through communication link 684 to a communication processing unit, for example server 686. Server 686 receives the communication and identifies the recipient, then forwarding the communication through link 688 to integrated server 660.

Thus, integrated server 660 has received communications from three exemplary sending units 650, 666, and 682. Integrated server 660 employs the rules described above with respect to the flowchart of FIG. 5 to promptly forward messages, or prioritize, list, and store the messages, as determined by the established rules. A voice message may be transmitted directly to telephone 664 through link 662, or to telephone 664 through terminal 680 and links 676 and 678, assuming that telephone 664 is connected as a peripheral to terminal 680. When connected through terminal 680 or terminal 692, a listing of the prioritized communications for the user is displayed, with hyperlinks to enable efficient receipt of a communication selected by the user. The message transmitted to integrated server 660 from sending terminal 682 is transmitted through link 690 to receiving terminal 692, whereas receiving terminal 692 is a different unit than receiving terminal 680. For example, receiving terminal 680 may be a desktop computer terminal and terminal 692 may be a PDA device. Otherwise, if no additional terminal 692 exists, both messages from sending terminal 666 and from sending terminal 682 would be received at receiving terminal 680.

As described above, the prioritization rules establish a sequencing of incoming communications by integrating server 660. Certain types of incoming communications are promptly presented to a user of the system, and others are held in storage for later use. Communications are grouped by category or listed in priority order.

The above describes the preferred embodiment of the invention. It will be appreciated however that various other modifications or additions will be apparent to those of ordinary skill in the art. All such modifications or additions are considered to be within the scope of the invention, as defined by the claims to follow.

What is claimed:

1. A method, comprising:

transmitting over a packet data network, from an application computer to a gatekeeper computer, information indicative of monitoring and control telephony functions desired by a user of said application computer, said application computer being located separately from any of at least two nodes of said packet data network;

arranging for a packetized telephone communications session between said at least two nodes of said packet data network, said arrangement being accomplished through said gatekeeper computer;

causing said packetized telephone communications session between said at least two nodes of said packet data network to occur;

reporting information indicative of said packetized communications session occurring to said application computer from said gatekeeper computer over said packet data network;

establishing classification categories for a variety of communications transmissions effected via said packet data network;

establishing priority sequencing guidelines for said classification categories;

receiving at least one communication transmission via said packet data network; and assigning a classification category to said communications transmission.

2. The method of claim 1, further comprising:

storing said communications transmissions according to said classification category assigned thereto.

3. The method of claim 2, further comprising:

selecting one of said stored communications transmissions for presentation to a user.

4. The method of claim 3, further comprising:

presenting said selected communications transmission to said user.

5. The method of claim 1, further comprising:

generating a signal to alert a user of the receipt of said communications transmission.

6. The method of claim 1, further comprising:

generating a separate signal for each classification category or user defined amalgamation of classification categories to alert a user of the receipt of a communication belonging to each of said category or belonging to said user defined amalgamation of various classification categories.

7. A method, comprising:

transmitting over a packet data network, from an application computer to a gatekeeper computer, information indicative of communications monitoring and control functions desired by a user of said application computer, said application computer being located separately from any of at least two nodes of said packet data network;

arranging for a packetized communications session between said at least two nodes of said packet data network, said arrangement being accomplished through said gatekeeper computer;

establishing classification categories for a variety of communications transmissions effected via said packet data network;

establishing priority sequencing guidelines for said classification categories;

causing said packetized communications session between said at least two nodes of said packet data network to occur;

determining into which classification category said communications transmissions go; and reporting information indicative of said packetized communications session to said application computer from said gatekeeper computer over said packet data network.

8. The method of claim 7, further comprising storing said communications transmissions according to said classification category assigned thereto.

9. The method of claim 8, further comprising selecting one of said stored communications transmissions for presentation to a user.

10. The method of claim 9, further comprising presenting said selected communications transmission to said user.

11. The method of claim 7, further comprising generating a signal to alert a user of the receipt of said communications transmissions.

12. The method of claim 7, further comprising:

generating a separate signal for each classification category or user defined amalgamation of classification categories to alert a user of the receipt of a communication belonging to each of said classification category or belonging to said each user defined amalgamation of various classification categories.

13. An article comprising a computer readable medium having instructions stored thereon which when executed by a processor causes:

transmitting over a packet data network, from an application computer to a gatekeeper computer, information indicative of monitoring and control telephony functions desired by a user of said application computer, said application computer being located separately from any of at least two nodes of said packet data network;

arranging for a packetized telephone communications session between said at least two nodes of said packet data network, said arrangement being accomplished through said gatekeeper computer;

causing said packetized telephone communications session between said at least two nodes of said packet data network to occur; and reporting information indicative of said packetized telephone communications session occurring to said application computer from said gatekeeper computer over said packet data network;

establishing classification categories for a variety of communications transmissions effected via said packet data network;

establishing priority sequencing guidelines for said classification categories;

receiving at least one communication transmission via said packet data network; and assigning a classification category to said communications transmission.

14. An article according to claim 13, which when executed by a processor further causes:

storing said communications transmissions according to said classification category assigned thereto.

15. An article to claim 14, which when executed by a processor further causes:

selecting one of said stored communications transmissions for presentation to a user; and presenting said selected communications transmission to said user.

16. An article according to claim 13, which when executed by a processor further causes:

generating a signal to alert a user of the receipt of said communications transmission.

17. An article comprising a computer readable medium having instructions stored thereon which when executed by a processor causes:

transmitting over a packet data network, from an application computer to a gatekeeper computer, information indicative of communications monitoring and control functions desired by a user of said application computer, said application computer being located separately from any of at least two nodes of said packet data network;

arranging for a packetized communications session between said at least two nodes of said packet data network, said arrangement being accomplished through said gatekeeper computer;

establishing classification categories for a variety or communications transmissions effected via said packet network;

establishing priority sequencing guidelines for the classification categories;

causing said packetized communication session between said at least two nodes of said packet data network to occur;

determining into which classification category said communications transmissions go; and reporting information indicative of said packetized communications session to said application computer from said gatekeeper computer over said packet data network.

18. An article according to claim 17, which when executed by a processor additionally causes: storing said communications transmissions according to said classification category assigned thereto.

19. An article according to claim 18, which when executed by a processor additionally causes:

selecting one of said stored communications transmissions for presentation to a user; and presenting said selected communications transmission to said user.

20. An article according to claim 18, which when executed by a processor additionally causes:

generating a signal to alert a user of the receipt of said communication.

21. An article according to claim 18, which when executed by a processor additionally causes:

generating a separate signal for each classification category, or user defined amalgamation of classification categories, to alert a user of the receipt of a communication belonging to each classification category, or belonging to said each user defined amalgamation of various classification categories.

* * * * *

UNITED STATES PATENT AND TRADEMARK OFFICE
CERTIFICATE OF CORRECTION

| | | |
|---|---|---|
| PATENT NO. | : 7,126,942 B2 | Page 1 of 1 |
| APPLICATION NO. | : 10/072468 | |
| DATED | : October 24, 2006 | |
| INVENTOR(S) | : Strathmeyer et al. | |

It is certified that error appears in the above-identified patent and that said Letters Patent is hereby corrected as shown below:

In column 11, line 19, in Claim 17, delete "or" and insert -- of --, therefor.

Signed and Sealed this

Twentieth Day of February, 2007

JON W. DUDAS
*Director of the United States Patent and Trademark Office*